United States Patent
Osborne et al.

(10) Patent No.: US 9,055,142 B2
(45) Date of Patent: Jun. 9, 2015

(54) APPARATUS AND METHOD FOR USE IN ASSEMBLY OF A PORTABLE APPARATUS

(75) Inventors: Gareth Osborne, Hampshire (GB); Esa-Sakari Maatta, Espoo (FI); Hutch Hutchison, Surrey (GB); Anton Fahlgren, San Francisco, CA (US); Casper Asmussen, Malmö (SE); Ville Henrikki Vehkapera, San Francisco, CA (US); Juha Kuivas, Oulu (FI); Yu-Chieh Lee, San Diego, CA (US); Noriaki Saika, San Diego, CA (US)

(73) Assignee: Nokia Technologies Oy, Espoo (FI)

( * ) Notice: Subject to any disclaimer, the term of this patent is extended or adjusted under 35 U.S.C. 154(b) by 166 days.

(21) Appl. No.: 13/421,972

(22) Filed: Mar. 16, 2012

(65) Prior Publication Data

US 2012/0236518 A1  Sep. 20, 2012

Related U.S. Application Data

(63) Continuation-in-part of application No. 12/316,602, filed on Dec. 15, 2008, now Pat. No. 8,284,558.

(51) Int. Cl.
*H05K 5/00* (2006.01)
*H04M 1/02* (2006.01)

(52) U.S. Cl.
CPC ........ *H04M 1/0249* (2013.01); *Y10T 29/49826* (2015.01)

(58) Field of Classification Search
USPC .......................... 361/728, 730, 807, 809, 810
See application file for complete search history.

(56) References Cited

U.S. PATENT DOCUMENTS

| | | | | |
|---|---|---|---|---|
| 4,468,718 | A | 8/1984 | Main | 362/399 |
| 5,081,551 | A | 1/1992 | Aruga | 137/571 |
| 5,369,549 | A | 11/1994 | Kopp et al. | 361/679 |
| 5,946,061 | A * | 8/1999 | Kurihara et al. | 349/58 |
| 6,542,206 | B1 | 4/2003 | Saito | 349/58 |
| 6,567,275 | B1 | 5/2003 | Hou et al. | 361/807 |
| 6,594,472 | B1 | 7/2003 | Curtis et al. | 455/90 |
| 6,671,012 | B1 * | 12/2003 | Tanaka | 349/58 |
| 6,741,298 | B1 * | 5/2004 | Won | 349/58 |
| 6,867,824 | B2 * | 3/2005 | Eiraku et al. | 349/58 |
| 6,876,409 | B2 * | 4/2005 | Park et al. | 349/58 |
| 6,930,734 | B2 | 8/2005 | Lee | 349/58 |
| 7,274,560 | B2 * | 9/2007 | Jeong et al. | 361/679.27 |
| 7,301,590 | B2 | 11/2007 | Lee | 349/58 |
| 7,576,990 | B2 | 8/2009 | Ni et al. | 361/737 |
| 7,636,244 | B2 * | 12/2009 | Kriege et al. | 361/800 |
| 7,742,316 | B2 | 6/2010 | Ho et al. | 361/818 |
| 8,169,564 | B2 * | 5/2012 | Chang | 349/58 |
| 8,284,558 | B2 * | 10/2012 | Osborne et al. | 361/752 |

OTHER PUBLICATIONS

Photograph of Vertu "Ascent Ti" telephone, Nokia Corporation, 2008, showing location of screws, 1 page.
Photograph of Nokia "6220 Classic" telephone, Nokia Corporation, 2008, showing location of screws under the Keypad, 1 page.
iPhone 3G Disassembly & Screen Replacement Directions by DirectFix.com dated Jul. 12, 2008. https://www.youtube.com/watch?v=8fF0DF-mbn4.

* cited by examiner

*Primary Examiner* — Hung S Bui
(74) *Attorney, Agent, or Firm* — Harrington & Smith

(57) ABSTRACT

An apparatus comprising: a first interconnector portion configured to fasten to a side part of a first housing portion of a portable apparatus, and a second interconnector portion rigidly connected to the first interconnector portion and configured to fasten to a second housing portion of the portable apparatus.

31 Claims, 9 Drawing Sheets

APPARATUS AND METHOD FOR USE IN ASSEMBLY OF A PORTABLE APPARATUS

CROSS REFERENCE TO RELATED APPLICATION

This patent application is a continuation-in-part of U.S. patent Application No. 12/316,602 filed on Dec. 15, 2008, now U.S. Pat. No. 8,284,558 which is hereby incorporated by reference in its entirety.

FIELD OF THE INVENTION

Embodiments of the present invention relate to an apparatus and a method for use in assembly of a portable apparatus. In particular, they relate to an apparatus and method for use in assembly of a mobile cellular telephone.

BACKGROUND TO THE INVENTION

Portable apparatus such as mobile cellular telephones usually include a plurality of housing portions that define the exterior of the portable apparatus and thereby provide a cover. The housing portions usually house the electronic components of the portable apparatus and may provide some protection from the environment (for example, rain) and from accidental damage (for example, being dropped by a user of the portable apparatus).

The housing portions are usually fastened to one another via screws. For example, screws may be inserted through apertures in one housing portion and engage a screw aperture in another housing portion. In order to obtain secure fastening of housing portions, apertures may be provided through internal structures within the portable apparatus (for example, the keypad frame). However, this may result in the internal structures becoming mechanically weaker and easier to damage. Alternatively, the housing portions may be increased in size so that the screws may be inserted in locations that are free from internal structures. However, this may result in the portable apparatus becoming undesirably large.

It would therefore be desirable to provide an alternative apparatus and method for use in assembly of a portable apparatus.

BRIEF DESCRIPTION OF VARIOUS EMBODIMENTS OF THE INVENTION

According to various, but not necessarily all, embodiments of the invention there is provided an apparatus comprising: a first interconnector portion configured to fasten to a side part of a first housing portion of a portable apparatus, and a second interconnector portion rigidly connected to the first interconnector portion and configured to fasten to a second housing portion of the portable apparatus.

The apparatus may be for use in assembly of a portable apparatus.

According to various, but not necessarily all, embodiments of the invention there is provided an apparatus comprising: means for fastening to a side part of a first housing portion of a portable apparatus, and means for fastening to a second housing portion of the portable apparatus, the means for fastening to the first housing portion being rigidly connected to the means for fastening to the second housing portion.

According to various, but not necessarily all, embodiments of the invention there is provided a portable apparatus comprising the apparatus described in the preceding paragraphs.

According to various, but not necessarily all, embodiments of the invention there is provided a method comprising: fastening a first interconnector portion to a side part of a first housing portion of a portable apparatus, and fastening a second interconnector portion, rigidly connected to the first interconnector portion, to a second housing portion of the portable apparatus.

The method may be for use in assembly of a portable apparatus.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

Figure 1:
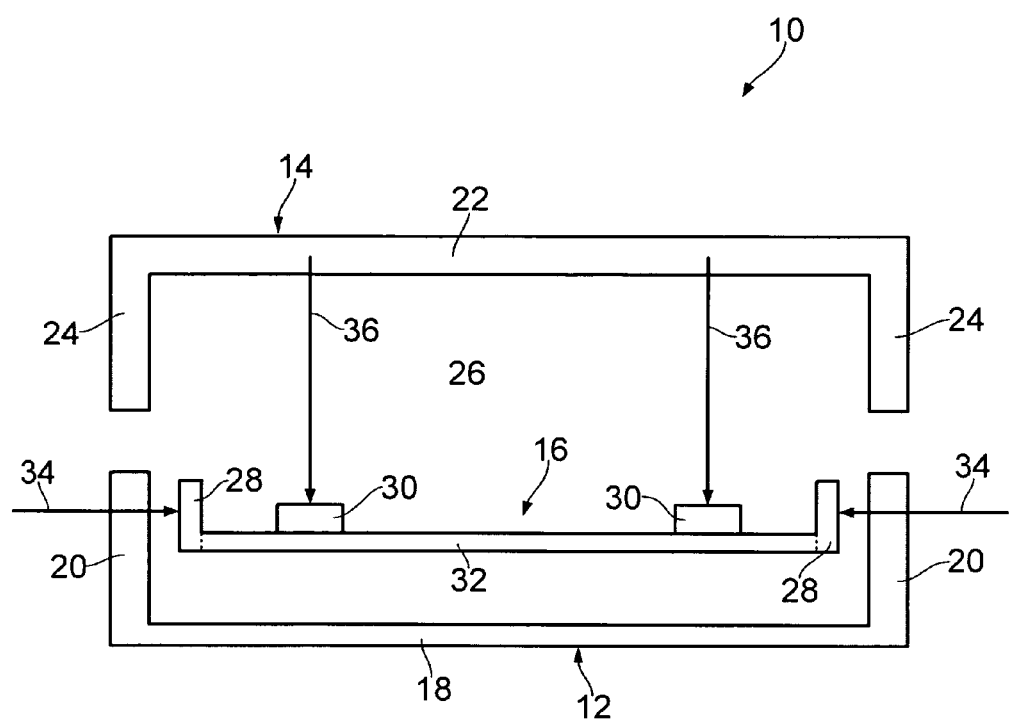
FIG. 1 illustrates a schematic cross sectional side view of an apparatus according to various embodiments of the present invention.

FIGS. 1 to 8 illustrate an apparatus 10 comprising: a first interconnector portion 28 configured to fasten to a side part 20 of a first housing portion 12 of a portable apparatus, and a second interconnector portion 30 rigidly connected to the first interconnector portion 28 and configured to fasten to a second housing portion 14 of the portable apparatus.

In more detail, FIG. 1 illustrates a schematic cross sectional side view of an apparatus 10 including a first housing portion 12, a second housing portion 14 and an interconnector 16. The apparatus 10 may be any portable apparatus and may be, for example, a portable electronic communication device, a mobile cellular telephone, a personal digital assistant (PDA) or a palm top computer. A portable apparatus is any apparatus that may be comfortably handled and operated by a user with one or two hands.

In the following description, the wording 'connect' and 'couple' and their derivatives mean operationally connected/coupled. It should be appreciated that any number or combination of intervening components can exist (including no intervening components).

The first housing portion 12 and the second housing portion 14 may function as a cover for the apparatus 10 and thereby define the exterior surface of the apparatus 10. The first housing portion 12 includes a front part 18 and side parts 20. The front part 18 includes one or more apertures for user input/output devices (for example, a display, a microphone, a loudspeaker, a keypad) and the side parts 20 extend substantially perpendicularly from the perimeter of the front part 18.

The second housing portion 14 includes a rear part 22 and side parts 24 that extend substantially perpendicularly from the perimeter of the rear part 22.

The first and second housing portions 12, 14 may comprise any suitable material and may comprise metal and/or plastic. The first and second housing portions 12, 14 may be coated in a protective material. For example, when the first and second housing portions 12, 14 comprise metal, they may be coated with a plastic layer that protects the metal from damage and rust.

The first housing portion 12 and the second housing portion 14 define a cavity 26 and may house electronic components of the portable apparatus 10 within the cavity 26. For example, the first and second housing portions 12, 14 may house a processor and a memory that are mounted on, and connected via a printed circuit board (not illustrated in this figure).

The interconnector 16 includes at least one first interconnector portion 28 and at least one second interconnector portion 30 that are rigidly connected to one another (via a third interconnector portion 32 for example) and are configured to fasten the first and second housing portions 12, 14 together. The interconnector 16 may comprise any suitable material(s) and may comprise metal for example. The various configurations of the first and second interconnector portions 28, 30 are described in more detail with reference to FIGS. 3 to 6 in the following paragraphs. However, it should be appreciated that the first and second interconnector portions 28, 30 may be configured to receive a fastener (a screw for example) for fastening to the first and second housing portions 12, 14 respectively. Additionally, it should be appreciated that the interconnector 16 may not in itself house any electronic components of the portable apparatus.

In this embodiment, the interconnector 16 is positioned wholly within the cavity 26 defined by the first and second housing portions 12, 14. In other embodiments, the interconnector 16 may be positioned partially within the cavity 26. For example, the interconnector 16 may be positioned so that the first interconnector portion 28 is external to the cavity 26 and so that the second interconnector portion 30 is within the cavity 26. Such an embodiment is described in the following paragraphs with reference to FIG. 6.

In various embodiments, the interconnector 16 is solely configured to fasten the first and second housing portions 12, 14 together. For example, the interconnector 16 may be a frame that is provided solely for fastening the first and second housing portions 12, 14 together. In other embodiments, the interconnector 16 is configured to provide a function in addition to being configured to fasten the first and second housing portions 12, 14 together. For example, the interconnector 16 may be a keypad frame that is configured to support the keypad and may also be configured to fasten the first and second housing portions 12, 14 together.

The one or more first interconnector portions 28 are configured to fasten to the side parts 20 of the first housing portion 12. The vector of the fastening force 34 provided by the one or more first interconnector portions 28 is substantially perpendicular to the side parts 20 of the first housing portion 12. The one or more second interconnector portions 30 are configured to fasten to the second housing portion 14. The vector of the fastening force 36 provided by the one or more second interconnector portions 30 is substantially perpendicular to the rear part 22 of the second housing portion 14. Consequently, the vectors of the fastening forces provided by the first and second interconnector portions 28 are substantially orthogonal to one another.

Figure 2:
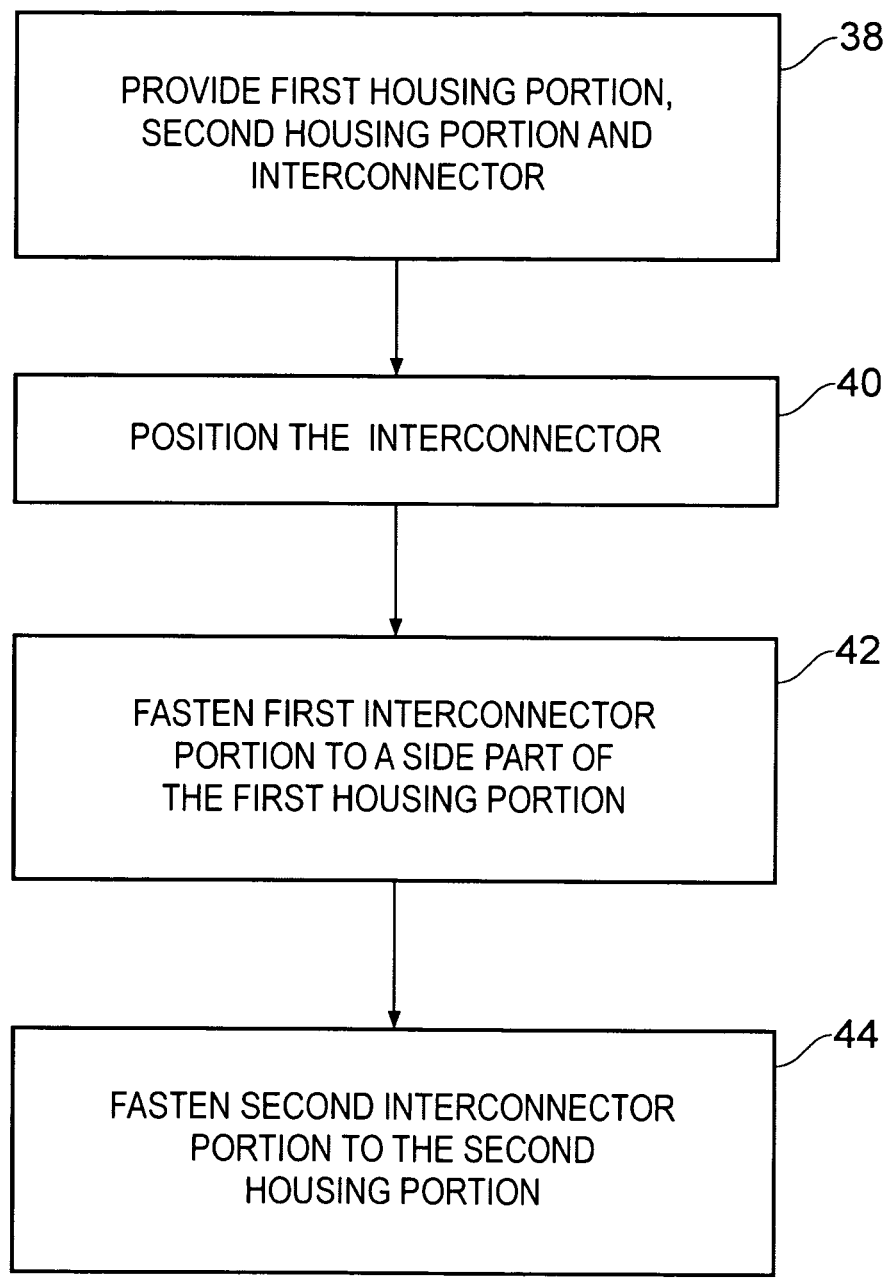
FIG. 2 illustrates a flow diagram of a method of assembling a portable apparatus according to various embodiments of the present invention.

A method for assembling an apparatus 10 according to various embodiments of the present invention is described in the following paragraphs with reference to FIGS. 1 and 2.

At block 38, the method includes providing the first housing portion 12, the second housing portion 14 and the interconnector 16. At block 40, the method includes positioning and orienting the interconnector 16 within the first housing portion 12 for fastening thereto. At block 42, the method includes fastening one or more first interconnector portions 28 to the side parts 20 of the first housing portion 12. At block 44, the method includes fastening one or more second interconnector portions 30 to the second housing portion 14.

The above described method of assembly may provide a portable apparatus 10 that has a substantially rigid cover formed from the first housing portion 12 and the second housing portion 14. Blocks 42 and 44 may be performed using specialist manufacturing tools that are only accessible to the manufacturer. Consequently, the user of the portable apparatus may not be able to disassemble and assemble the portable apparatus.

The illustration of a particular order to the above blocks does not necessarily imply that there is a required or preferred order for the blocks and the order and arrangement of the block may be varied. Furthermore, it may be possible for some blocks to be omitted.

Embodiments of the present invention may provide an advantage in that the first and second housing portions 12, 14 are fastened to one another via the interconnector 16. Consequently, any structures (for example, a keypad frame) which are positioned between the interconnector 16 and the front part 18 may not require any apertures for fasteners (such as screws). Therefore, embodiments of the present invention may provide a portable apparatus that has relatively rigid internal structures and is relatively narrow in comparison with other portable apparatus.

Figure 3:
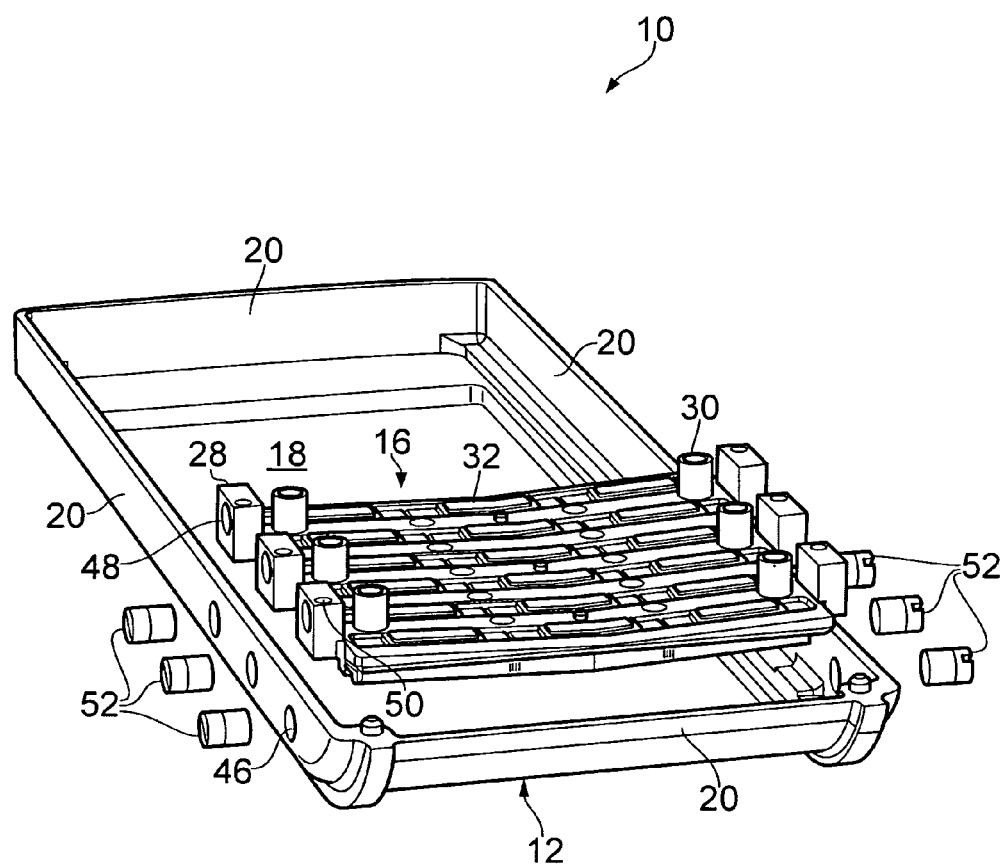
FIG. 3 illustrates a perspective view of another apparatus according to various embodiments of the present invention.
Figure 3A:
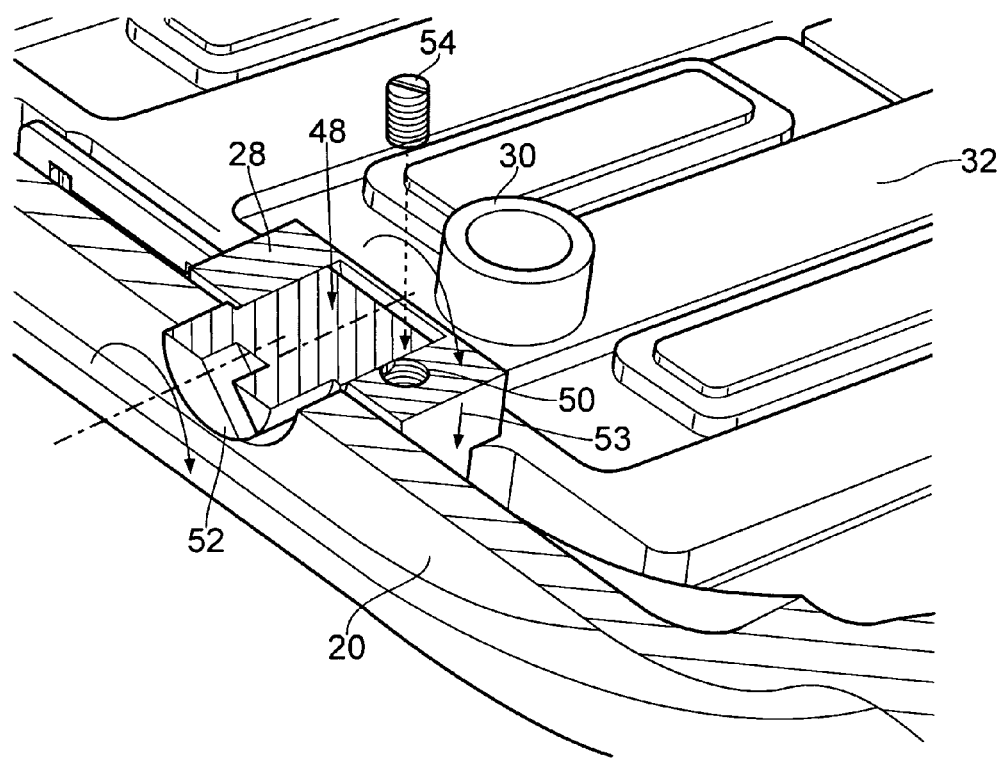
FIG. 3A illustrates a close up perspective view of the apparatus illustrated in FIG. 3.

FIGS. 3 and 3A illustrate a perspective view of another apparatus 10 according to various embodiments of the present invention. The apparatus 10 illustrated in FIGS. 3 and 3A is similar to the apparatus illustrated in FIG. 1 and where the features are similar, the same reference numerals are used.

In this embodiment, the interconnector 16 comprises a substantially planar keypad frame 32 that rigidly connects cam receiving members 28 (the first interconnector portions) and screw receiving members 30 (the second interconnector portions). The cam receiving members 28 include an aperture 48 for receiving a cam and an aperture 50 for receiving a fastener (a grub screw for example) for fixing a cam in place in the cam aperture 48. The keypad frame 32 is substantially rectangular and the cam receiving members 28 are positioned around the perimeter of the keypad frame 32 along the two short edges. The screw receiving members 30 are positioned adjacent the cam receiving members 28.

The side parts 20 of the first housing portion 12 include cam receiving apertures 46. In assembly of the apparatus 10, the interconnector 16 is positioned within the first housing portion 12 so that the cam receiving apertures 46 of the side parts 20 are lined up with the cam receiving members 28. Cams 52 are then inserted through the cam receiving apertures 46 of the side parts 20 and into the apertures 48 of the cam receiving members 28. As illustrated in FIG. 3A, the cams 52 are rotated about their axis in order to move the interconnector 16 in the direction of arrow 53 towards the front part 18 and to fasten the first housing portion 12 and the interconnector 16 together. The cams 52 are then fixed in place by the grub screw 54.

Figure 4:
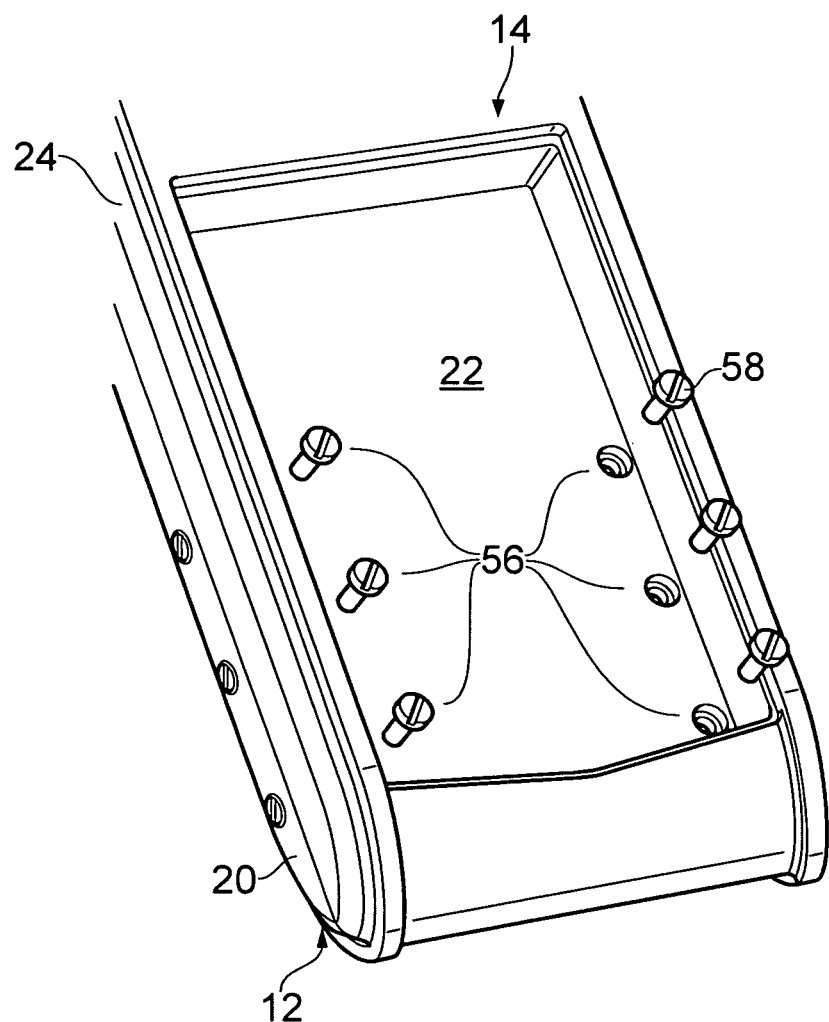
FIG. 4 illustrates a rear perspective view of an apparatus according to various embodiments of the present invention.

With reference to FIGS. 3 and 4, the second housing portion 14 is positioned on the first housing portion 12 so that the side parts 24 of the second housing portion 14 abut the side parts 20 of the first housing portion 12. The rear part 22 of the second housing portion 14 includes a plurality of apertures 56 and in assembly, screws 58 are inserted into the apertures 56 and fastened to the screw receiving members 30 of the interconnector 16.

Figure 5:
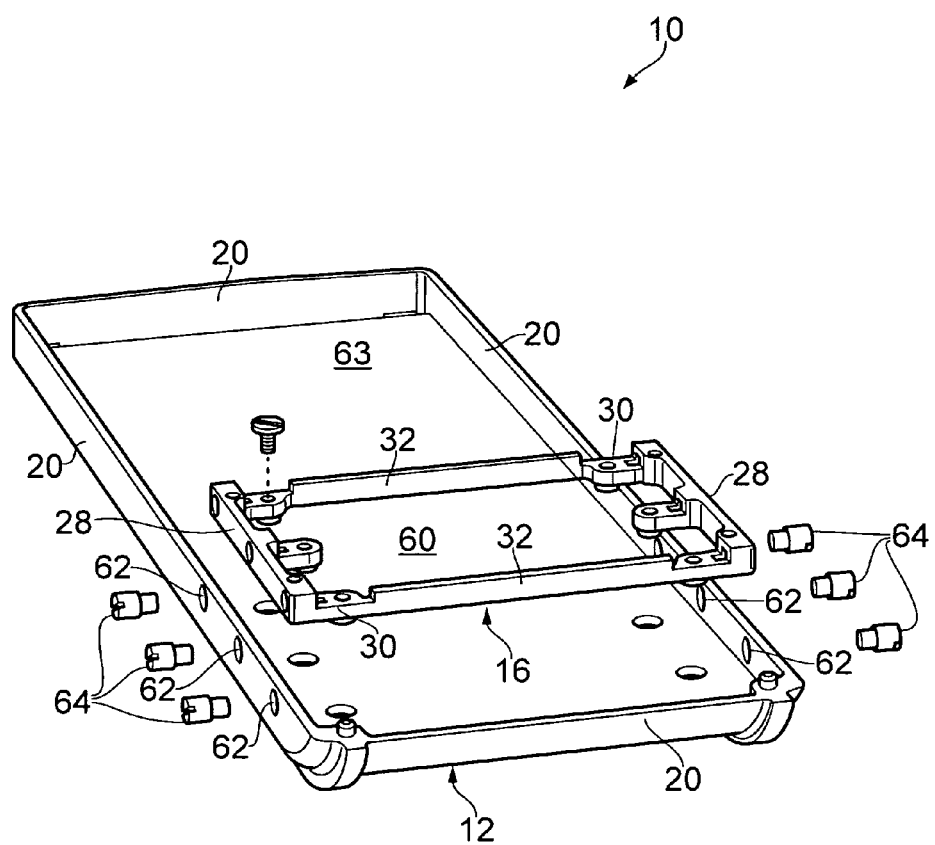
FIG. 5 illustrates a perspective view of another apparatus according to various embodiments of the present invention.

FIG. 5 illustrates a perspective view of a further apparatus 10 according to various embodiments of the present invention. The apparatus 10 illustrated in FIG. 5 is similar to the apparatus illustrated in FIGS. 1, 3 & 3A and where the features are similar, the same reference numerals are used.

In this embodiment, the interconnector 16 comprises a substantially planar frame that is solely provided for fastening the first and second housing portions 12, 14 together. The frame 16 is substantially rectangular and defines a substantially rectangular aperture 60. The frame 16 includes screw receiving members 28 (the first interconnector portions) that provide the two short edges of the frame 16 and include a plurality of apertures for receiving screws. The frame 16 also includes screw receiving members 30 (the second interconnector portions) that are positioned adjacent the screw receiving members 28. The screw receiving members 28, 30 are rigidly connected to one another via frame portions 32 which provide the long edges of the frame 16.

The side parts 20 of the first housing portion 12 include screw receiving apertures 62. In assembly of the apparatus 10, the frame 16 is positioned within the first housing portion 12 so that it is adjacent a printed circuit board 63 housed with the first housing portion 12 and so that the screw receiving apertures 62 of the side parts 20 are lined up with the apertures of the screw receiving members 28. Additionally, the frame 16 is oriented substantially parallel with the printed circuit board 63. Screws 64 are then inserted through the apertures 62 of the side parts 20 and into the screw receiving members 28. The screws 64 are then rotated in order to fasten the first housing portion 12 and the frame 16 together. The second housing portion 14 may then be fastened to the frame 16 as described above with reference to FIG. 4.

The embodiment illustrated in FIG. 5 may provide an advantage in that it does not require the keypad frame (or any other existing internal structure that may function as an interconnector) to be rigid since the interconnector 16 is provided by a dedicated frame. This may provide the portable apparatus manufacturer with greater design freedom in selecting materials for the keypad frame (or any other existing internal structure that may function as an interconnector). Additionally, since the interconnector 16 is separate to the keypad frame, the positioning of the second interconnector portion(s) 30 does not affect the layout of the keypad of the portable apparatus.

Figure 6:
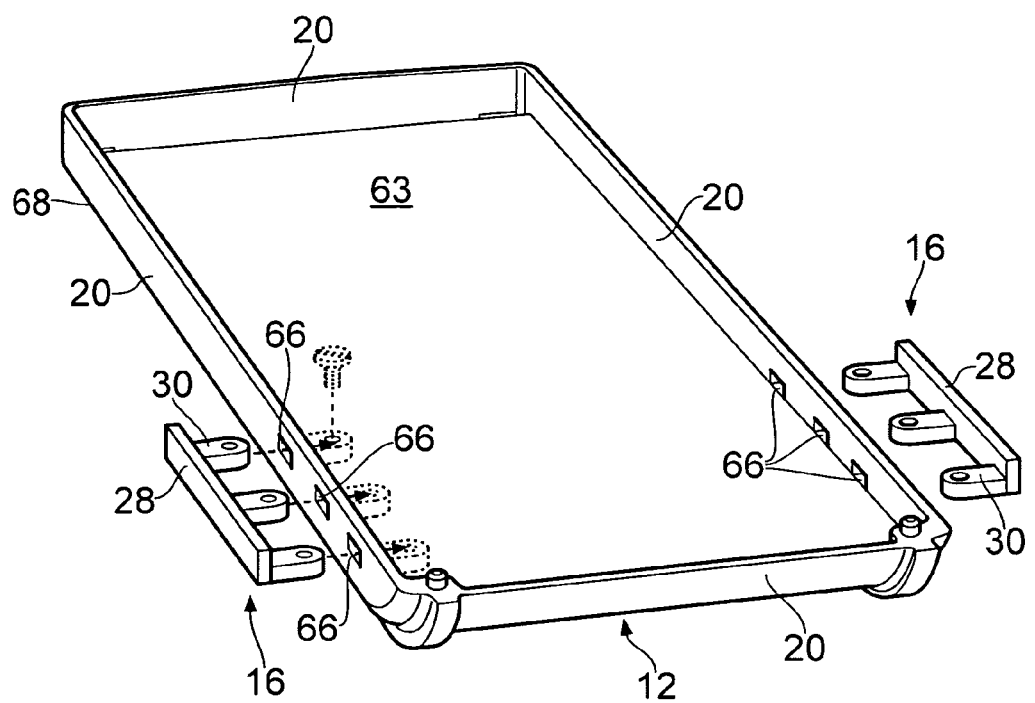
FIG. 6 illustrates a perspective view of a further apparatus according to various embodiments of the present invention.

FIG. 6 illustrates a perspective view of another apparatus 10 according to various embodiments of the present invention. The apparatus 10 illustrated in FIG. 6 is similar to the apparatus illustrated in FIGS. 1, 3, 3A and 5 and where the features are similar, the same reference numerals are used.

In this embodiment, the apparatus 10 includes two interconnectors 16 that each include a bracket 28 (the first interconnector portion) and three screw receiving members 30 (second interconnector portions) that extend perpendicularly from the bracket 28. It should be appreciated that in other embodiments, the apparatus 10 may include any number of interconnectors 16 and each interconnector 16 may include one or more screw receiving members 30.

The side parts 20 of the first housing portion 12 include apertures 66. In assembly of the apparatus 10, the screw receiving members 30 are inserted into the apertures 66 until the brackets 28 abut an exterior surface 68 of the side parts 20. The screw receiving members 30 are thereby positioned within the first housing portion 12 so that they are adjacent a printed circuit board 63 housed within the first housing portion 12. The second housing portion 14 may then be fastened to the frame 16 as described above with reference to FIG. 4.

It should be understood that in this embodiment the brackets 28 fasten to the side parts 20 of the first housing portion 12 through their abutment with the exterior surface 68 of the side parts 20. Additionally, screws (not illustrated) may be used to secure the brackets 28 to the side parts 20 the first housing portion 12.

As with the embodiment illustrated in FIG. 5, the embodiment illustrated in FIG. 6 may provide an advantage in that it does not require the keypad frame (or any other existing internal structure that may function as an interconnector) to be rigid since the interconnectors 16 are provided by a dedicated bracket 28 and one or more screw receiving members 30. Once again, this may provide the portable apparatus manufacturer with greater design freedom in selecting materials for the keypad frame (or any other existing internal structure that may function as an interconnector). Additionally, since the interconnectors 16 are separate to the keypad frame, the positioning of the second interconnector portion(s) 30 do not affect the layout of the keypad of the portable apparatus.

Since the screw receiving members 30 are positioned between the printed circuit board 63 and the rear part 22 of the second housing portion 14, the printed circuit board 63 does not include any apertures for receiving the screws 58. This may advantageously result in a printed circuit board 63 having a greater useable surface area.

Figure 7:
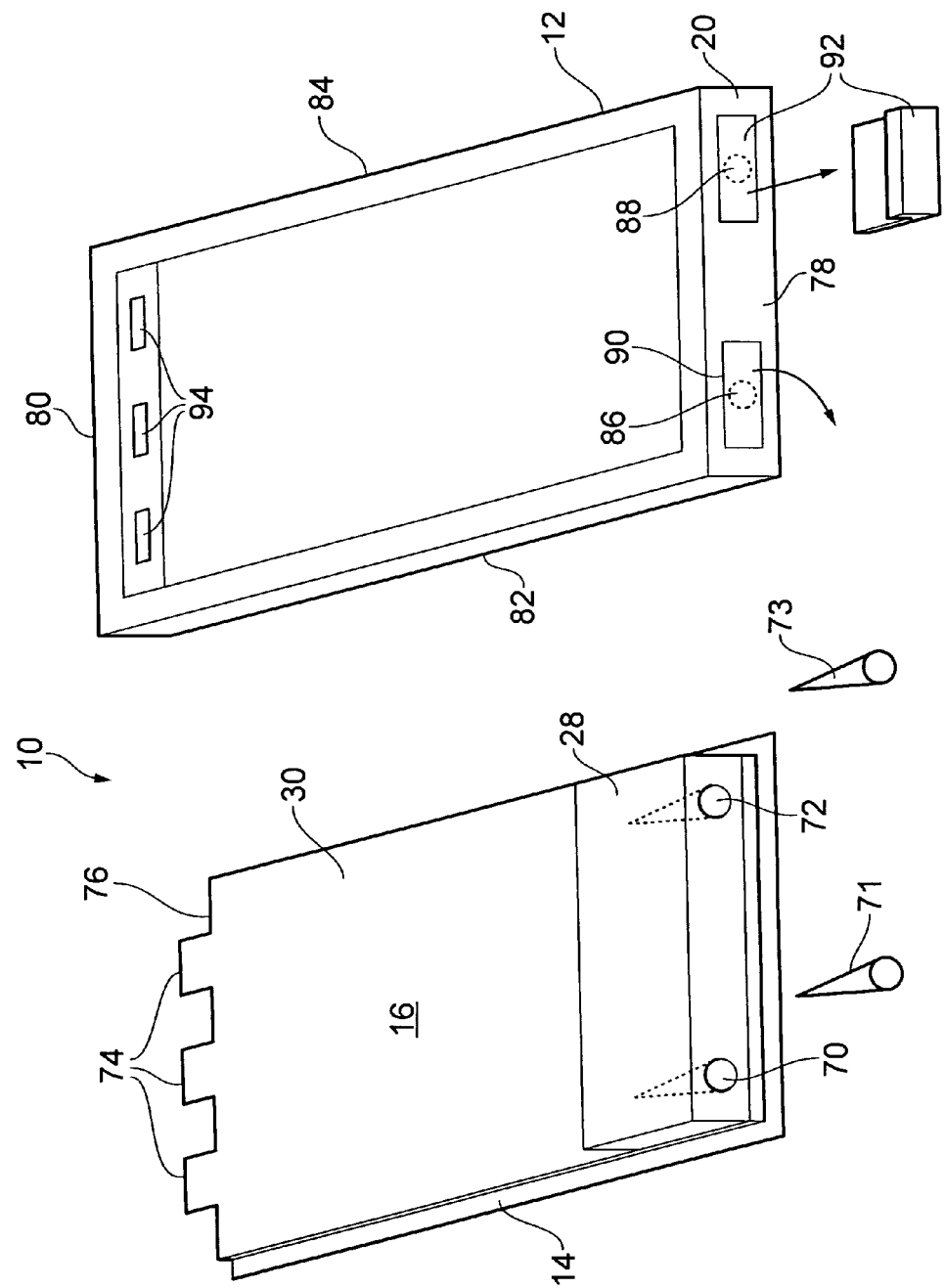
FIG. 7 illustrates a perspective view of another apparatus according to various embodiments of the invention.

FIG. 7 illustrates a perspective view of another apparatus 10 according to various embodiments of the invention. The apparatus 10 illustrated in FIG. 7 is similar to the apparatus illustrated in FIGS. 1, 3, 3A, 5 and 6 and where the features are similar, the same reference numerals are used. The apparatus 10 includes a first housing portion 12, a second housing portion 14 and an interconnector 16.

The interconnector 16 includes a first interconnector portion 28 that defines a first hole 70 for receiving a fastener 71 (such as a screw) and a second hole 72 for receiving a fastener 73. The interconnector 16 also includes a plurality of protrusions 74 that extend from one side edge 76 of the interconnector 16. The plurality of protrusions 74 may be considered as a part of the first interconnector portion 28.

The interconnector 16 also includes a second interconnector portion 30 that is coupled to the second housing portion 14 (such as a display module) via an adhesive.

The first housing portion 12 is substantially rectangular in shape and includes a first side edge 78, a second side edge 80, a third side edge 82 and a fourth side edge 84. The first and second side edges 78, 80 are shorter than the third and fourth side edges 82, 84. The first side edge 78 defines a first aperture 86 for receiving the fastener 71 therein and a second aperture 88 for receiving the fastener 73 therein.

The first side edge 78 of the first housing portion 12 includes a door 90 that is moveable between an open position and a closed position. When the door is in the closed position, the first aperture 86 is concealed by the door (that is, the first aperture 86 is behind the door 90 and is not accessible to a person or machine outside of the apparatus 10). When the door is in the open position the first aperture 86 is accessible (that is, the first aperture 86 may be accessed by a person or a machine outside of the apparatus 10).

The first side edge 78 of the first housing portion 12 also includes a removable member 92 (such as a tray for an electronic data card) that is moveable between a position in which it is present in the first housing portion 12 and a position in which it is removed from the first housing portion 12. When the removable member 92 is present in the first housing portion 12, the second aperture 88 is concealed by the removable member 92, and when the removable member 92 is removed from the first housing portion 12, the second aperture 88 is accessible.

The second side edge 80 of the first housing portion 12 defines a plurality of cavities 94 that are configured to receive the protrusions 74 of the interconnector 16 therein.

In assembly, the first housing portion 12 and the second housing portion 14 are fastened together by first coupling the interconnector 16 and the second housing portion 14. For example, the interconnector 16 and the second housing portion 14 may be coupled together via adhesive. Next, the plurality of protrusions 74 are positioned in the plurality of cavities 94 so that the first and second apertures 86, 88 line up with the first and second holes 70, 72 respectively. Next, the door 90 is opened and the removable member 92 is removed and then the fasteners 71, 73 are inserted into the first and second apertures 86, 88 and the holes 70, 72 to fasten the interconnector 16 and the first housing portion 12 together. The door 90 may then be closed and the removable member 92 may then be positioned in the first housing portion 12 in order to conceal the fasteners 71, 73.

It should be appreciated that in other embodiments, the first interconnector portion 74 may include any number of protrusions 74 and may include only one protrusion. It should also be appreciated that the first housing portion 12 may include any number of cavities 94 and may include only one cavity 94.

Figure 8:
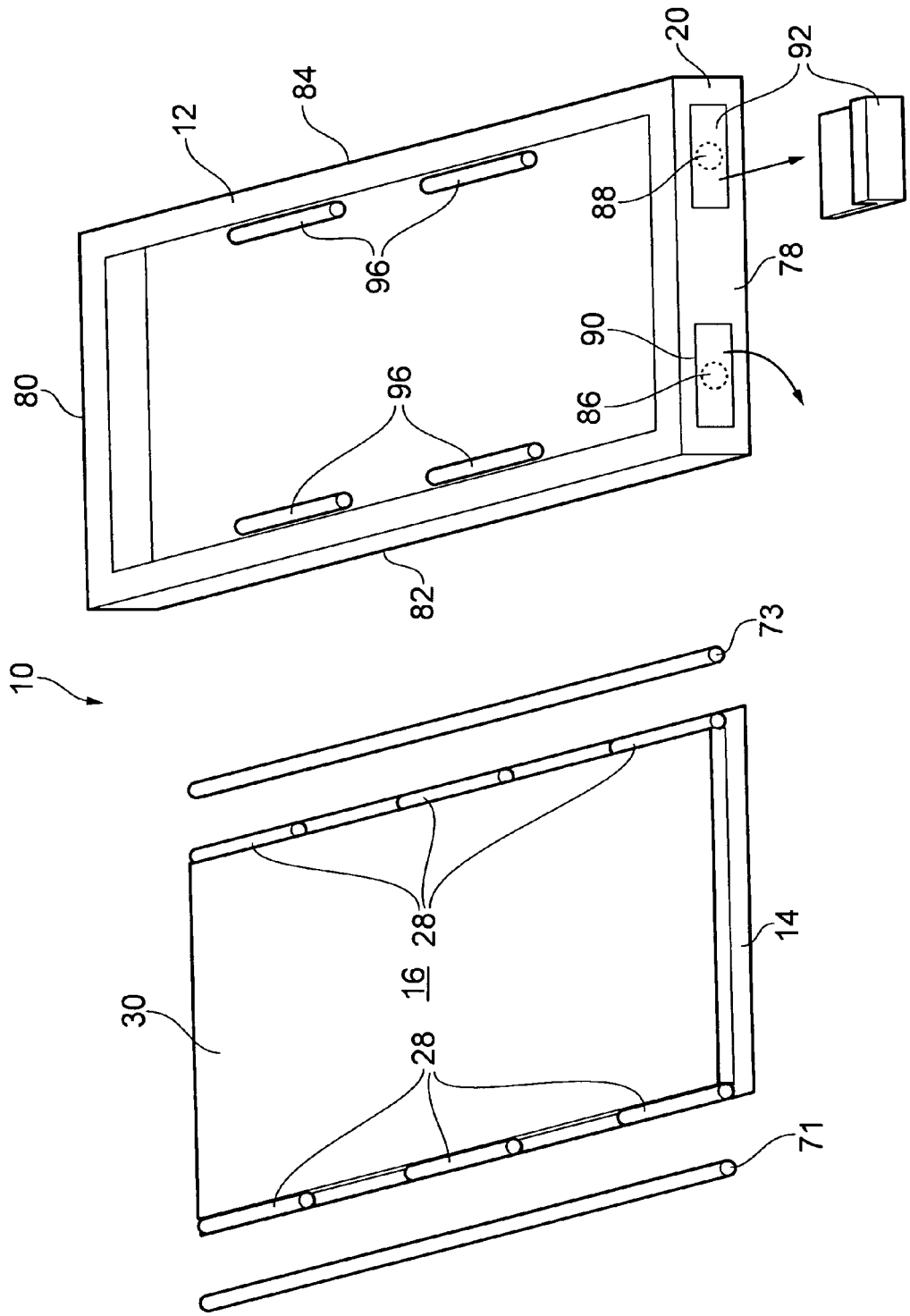
FIG. 8 illustrates a perspective view of a further apparatus according to various embodiments of the invention.

FIG. 8 illustrates a perspective view of a further apparatus 10 according to various embodiments of the invention. The apparatus 10 illustrated in FIG. 8 is similar to the apparatus illustrated in FIG. 7 and where the features are similar, the same reference numerals are used.

In this embodiment, the first interconnector portion 28 includes a plurality of hoops that are arranged around a part of the perimeter of the interconnector 28 and are configured to receive fasteners 71, 73 therein. The fasteners 71, 73 are pins that have a length that is similar to the length of the interconnector 16.

The first housing portion 12 also includes a plurality of hoops 96 that are arranged on an inner surface of the third and fourth side edges 82, 84 of the first housing portion 12. The plurality of hoops 96 are arranged so that when the interconnector 16 and the first housing portion 12 are positioned together the plurality of hoops of the first interconnector portion 28 line up and alternate with the plurality of hoops 96 of the first housing portion 12.

The interconnector 16 also includes a second interconnector portion 30 that is coupled to the second housing portion 14 (such as a display module) via an adhesive.

In assembly, the first housing portion 12 and the second housing portion 14 are fastened together by first coupling the interconnector 16 and the second housing portion 14. For example, the interconnector 16 and the second housing portion 14 may be coupled via adhesive. Next, the interconnector 16 and the first housing portion 12 are positioned together so that the plurality of hoops 28, 96 and the apertures 86, 88 line up with one another. Next, the door 90 is opened and the removable member 92 is removed and then the fasteners 71, 73 are inserted into the apertures 86, 88 and the hoops 28, 96 to fasten the interconnector 16 and the first housing portion 12 together. The door 90 may then be closed and the removable member 92 may then be positioned in the first housing portion 12 in order to conceal the fasteners 71, 73.

It should be appreciated that the first interconnector portion 74 may include any number of hoops 28 and may include only one hoop. It should also be appreciated that the first housing portion 12 may include any number of hoops 96 and may include only one hoop or no hoops.

The apparatus 10 illustrated in FIGS. 7 and 8 provide an advantage in that the first and second housing portions 12, 14 are fastened together and there is no part of the fastening apparatus (such as the interconnector 16 and the fasteners 71, 73) that is visible during normal use of the apparatus 10 (since the fasteners 71, 73 and the interconnector 16 are concealed by the moveable members 90, 92). This may help to improve the aesthetic appearance of the apparatus 10.

Although embodiments of the present invention have been described in the preceding paragraphs with reference to various examples, it should be appreciated that modifications to the examples given can be made without departing from the scope of the invention as claimed. For example, the first interconnector portion 28 may be a fastener receiving member and the second interconnector portion 30 may be a bracket. Furthermore, the interconnector 16 may have any shape.

The portable apparatus 10 may be configured it receive a battery on the exterior surface of the rear part 22 of the second housing portion 14. In this embodiment, the rear part 22 does not provide an exterior surface of the portable apparatus 10 since a third housing portion is then provided to cover the battery.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
   a first housing portion and a second housing portion defining an exterior surface of the apparatus,
   an interconnector comprising a first interconnector portion and a second interconnector portion rigidly connected to the first interconnector portion,
   a frame structure located between the interconnector and a front part of the first housing, wherein
   the first interconnector portion is configured to fasten to a side part of the first housing portion, and
   the second interconnector portion configured to fasten to the second housing portion.

2. The apparatus as claimed in claim 1, wherein the second interconnector portion is configured to fasten to the second housing portion via an adhesive.

3. The apparatus as claimed in claim 1, further comprising the first housing portion including a door moveable between an open position and a closed position, and a first aperture defined by the first housing portion, wherein when the door is in the closed position the first aperture is concealed by the door, and when the door is in the open position the first aperture is accessible.

4. The apparatus as claimed in claim 1, further comprising the first housing portion including a removable member, and a second aperture defined by the first housing portion, wherein when the removable member is present in the first housing portion the second aperture is concealed by the removable member, and when the removable member is removed from the first housing portion, the second aperture is accessible.

5. The apparatus as claimed in claim 1, wherein the first interconnector portion is configured to receive a fastener for fastening the first housing portion and the first interconnector portion together.

6. The apparatus as claimed in claim 1, wherein the first interconnector portion includes one or more protrusions and the first housing portion includes one or more cavities configured to receive the one or more protrusions of the first interconnector portion.

7. The apparatus as claimed in claim 1, wherein the first interconnector portion includes one or more hoops and the first housing portion includes a third aperture, the one or more hoops and the third aperture being configured to receive a fastener therein for fastening the first housing portion and the first interconnector portion together.

8. The apparatus as claimed in claim 7, further comprising a first housing portion including one or more hoops, and wherein the third aperture, the one or more hoops of the first interconnector portion and the one or more hoops of the first housing portion are configured to receive a fastener therein for fastening the first housing portion and the first interconnector portion together.

9. A portable apparatus comprising the apparatus as claimed in claim 1.

10. The apparatus as claimed in claim 1, wherein the interconnector is integral to the frame structure.

11. The apparatus as claimed in claim 1 wherein the front part comprises one or more apertures for any one or more of a display, a microphone, a loudspeaker, a keypad.

12. The apparatus as claimed in claim 1 wherein the frame structure does not require any apertures for screws.

13. The apparatus as claimed in claim 1 wherein the frame structure supports a keypad.

14. A method comprising:
providing a frame structure between a first interconnector and a front part of a first housing, said interconnector comprising a first and second interconnector portion,
fastening the first interconnector portion to a side part of the first housing portion of a portable apparatus, and
fastening the second interconnector portion, rigidly connected to the first interconnector portion, to a second housing portion of the portable apparatus.

15. The method as claimed in claim 14, wherein the first housing portion includes a door moveable between an open position and a closed position, and a first aperture defined by the first housing portion, wherein when the door is in the closed position the first aperture is concealed by the door, and when the door is in the open position the first aperture is accessible.

16. An apparatus comprising:
a first interconnector portion configured to fasten to a side part of a first housing portion of a portable apparatus, and
a second interconnector portion rigidly connected to the first interconnector portion and configured to fasten to a second housing portion of the portable apparatus,
the first housing portion including a door moveable between an open position and a closed position, and a first aperture defined by the first housing portion, wherein when the door is in the closed position the first aperture is concealed by the door, and when the door is in the open position the first aperture is accessible.

17. The apparatus as claimed in claim 16, further comprising a removable member, and a second aperture defined by the first housing portion, wherein when the removable member is present in the first housing portion the second aperture is concealed by the removable member, and when the removable member is removed from the first housing portion, the second aperture is accessible.

18. The apparatus as claimed in claim 16, wherein the first interconnector portion is configured to receive a fastener for fastening the first housing portion and the first interconnector portion together.

19. The apparatus as claimed in claim 16, wherein the first interconnector portion includes one or more protrusions and the first housing portion includes one or more cavities configured to receive the one or more protrusions of the first interconnector portion.

20. A portable apparatus comprising the apparatus as claimed in claim 16.

21. An apparatus comprising:
a first housing portion and a second housing portion defining an exterior surface of the apparatus, having front, rear, and side parts, said first and second housing portion defining a cavity, where a frame structure and a printed circuit board are located in the cavity, the frame structure is oriented substantially parallel to the printed circuit board,
the frame structure configured to fasten the first and second housing portions,
the frame structure comprising one or more first interconnect portions,
the first interconnector portion is configured to fasten to the side part of the first housing portion, wherein the first interconnect is configured to receive a fastener through an aperture in the exterior of the apparatus.

22. The apparatus according to claim 21 wherein the frame is substantially rectangular and the one or more first interconnect portions are screw receiving members.

23. The apparatus according to claim 22 wherein the frame defines a substantially rectangular aperture.

24. The apparatus according to claim 21 wherein a side part of the first housing comprises screw receiving apertures.

25. The apparatus according to claim 21 wherein the frame structure is configured to support a keypad frame.

26. The apparatus according to claim 21 wherein any structures positioned between the interconnector and a front part of the first housing structure do not require screws.

27. The apparatus according to claim 21 wherein any structures positioned between the frame and a front part of the first housing structure do not require screws.

28. The apparatus according to claim 21 wherein the interconnector is contained wholly within a cavity defined by the first and second housing portion.

29. The apparatus according to claim 21 wherein the frame structure comprises a metal.

30. The apparatus according to claim 21 wherein the apparatus is any of; a portable electronic communication device, a mobile cellular telephone, a personal digital assistant or a palm top computer.

31. The apparatus according to claim 21 wherein the frame structure is adjacent to two opposing edges of the first and/or second housing.

* * * * *